Figure 1:
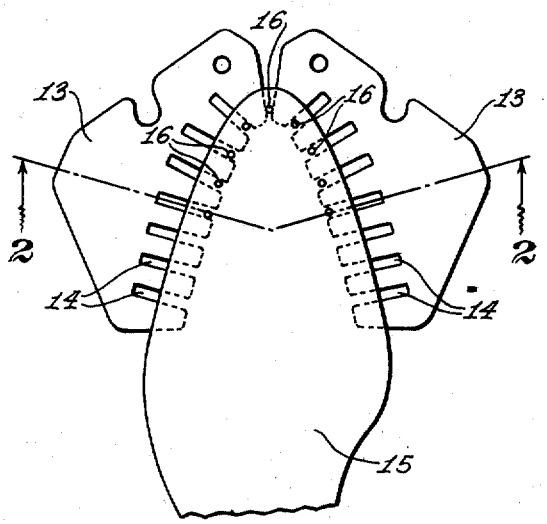

June 4, 1929. C. B. SPALSBURY Re. 17,317

METHOD OF LASTING SHOES

Original Filed May 2, 1924

Inventor:
CHARLES B. SPALSBURY,
By John H. Bruninga
His Attorney.

Reissued June 4, 1929. Re. 17,317

UNITED STATES PATENT OFFICE.

CHARLES B. SPALSBURY, OF ST. LOUIS, MISSOURI, ASSIGNOR TO JOHNSON, STEPHENS & SHINKLE SHOE COMPANY, OF ST. LOUIS, MISSOURI, A CORPORATION OF MISSOURI.

METHOD OF LASTING SHOES.

Original No. 1,584,820, dated May 18, 1926, Serial No. 710,555, filed May 2, 1924. Application for reissue filed November 2, 1927. Serial No. 230,672.

My present invention relates to shoes, and more particularly to an improved method of lasting the toe portion of shoes.

In Patent No. 1,602,368, issued October 5, 1926, I have described and claimed an improved method of making shoes so as to produce an improved McKay type of shoe that has all the desirable features of a McKay shoe as regards strength of structure while also having the advantages of a welt shoe as regards flexibility and, in the production of such shoe, I utilize the usual and ordinary component parts of the ordinary upper, the ordinary insole, and the ordinary outsole. In Patent No. 1,572,042, issued February 9, 1926, I have described and claimed an improved method of making shoes whereby there is produced an improved shoe of the McKay type and in the construction of which I employ a novel form of combined outsole and insole as described in Patent No. 1,600,019, Sept. 14, 1926. The present invention relates to an improved process of lasting the toe portion of shoes, which method is particularly capable of being practiced on tackless McKay shoes, whether the structures thereof include the ordinary insole and outsole or the novel form of combined insole and outsole such as that referred to.

One of the objects of this invention is to provide a method of lasting and securing the upper around the toe of a shoe, whereby the upper will not only be closely conformed to the last, but in which the presence of tacks in the finished shoe is obviated, especially around the toe.

Another object is to provide a method whereby the operations may be performed in a simple and expeditious manner.

Another object is to provide a method of lasting and tacking, which is particularly applicable for coordination with the methods described in the patents referred to, whereby the entire forepart, including the toe as well as the ball and shank, will not only be conformed to the last, but in which the presence of tacks in the finished shoe is substantially obviated.

Further objects will appear from the detail description, taken in connection with the accompanying drawing.

Generally stated, in accordance with this invention, the upper is so lasted around the toe as to conform closely to the last; this is accomplished, in accordance with one embodiment, by wiping the upper over the last and more particularly over an insole part on the last around the toe, as by moving wipers over the last and insole part and engaging the upper substantially continuously therealong. An outsole part is then laid on the part of the upper so lasted and temporarily tacked thereto while the upper is held under tension due to the wiping; this is accomplished, in accordance with one embodiment, by inserting temporary lasting tacks through the outsole part and into the lasted upper at points defined by slots or recesses in the wipers and while the latter are in wiping relation. The sole and upper are then retained in assembled relation and in close conformity to the last; the wiping means can then be withdrawn while the parts are so retained. The last can then be withdrawn (assuming that the forepart has been lasted as described in the patents referred to) and the parts permanently secured together, as by seaming or stitching through the sole and upper, and the lasting tacks withdrawn, all as described in the patents referred to. There is thus produced a shoe which is not only substantially free of tacks, especially around the toe, but which conforms closely to the last on which it is made.

In practicing my improved method, I preferably take the shoe (after one of the lasting operations, as described in one or the other of said patents) and last the toe portion thereof, temporarily fastening the upper portion of the toe with wire, cut away the surplus lining and box toe material, and re-last the shoe on a bed machine by means of a specially formed toe wiper, and then tack through the outsole, upper, and into the insole while the upper is held in lasting position under tension due to the wiping, and then completing the construction of the shoe by withdrawing the lasting device and sewing the shoe, etc.

In the accompanying drawing I have shown, diagrammatically, views of a shoe illustrating the novel method of lasting the toe portion thereof and in the drawing.

Figure 2:
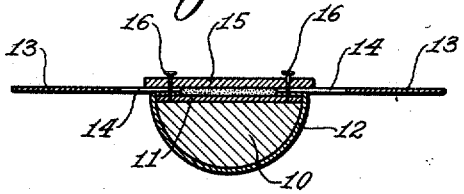

Fig. 1 illustrates, in plan view, a shoe with the toe wipers and temporary lasting tacks in position, and Fig. 2 is a vertical sectional elevation on the line 2—2 of Fig. 1.

Referring to the drawing, 10 designates a last on which may be temporarily secured the usual and ordinary form of insole 11. The last with the insole in position thereon is placed in a lasting machine—such, for example, as that shown in Patent No. 1,588,916, issued June 15, 1926. The upper 12 is placed on the last 10 and by means of the methods described and claimed in said Patents Nos. 1,602,368 or 1,572,042 such upper is lasted to the insole and held by temporary lasting tacks or by means of the wipers employed in the lasting operation. The box toe is placed in position on the shoe structure, the upper is lasted thereover around the toe and into position on the insole, and the lasted members temporarily fastened with wire, and after the box has become set, the wire is moved and the surplus lining and box toe material is cut away. The shoe structure is now re-lasted on a bed machine having a special form of toe wiper 13 provided with a plurality of slots or recesses 14, as shown. While the toe portion of the upper is held in position by means of the slotted wiper blades 13, the outsole 15 is placed in position, laid on the lasted part, and the tacks 16 are driven through the outsole, upper, and into the insole, as shown in Fig. 2, while the upper is under tension due to the wiping. The last 10 is now withdrawn from the shoe structure which can then be processed in the usual manner to complete the same.

My improved method may be utilized on shoe structures having the usual and ordinary type of insole 11 and outsole 15 or on shoes in which there is utilized a special form of combined insole and outsole, such as is described in Patent No. 1,572,042, above referred to. The resulting shoe is a McKay shoe, but is absolutely tackless and therefore extremely flexible, and as the lasting fastenings in the ordinary McKay shoe add nothing to the strength of the structure after the sewing operation and only serve to stiffen the shoe and frequently work upward through the insole into the foot of the wearer, the shoe produced by my improved method is a decided improvement over the shoes of this type in the prior art. The resulting shoes have all the advantages of the McKay type of shoe as regards strength of structure and all the advantages of a welt shoe as regards flexibility.

While I have specifically described a procedure in which the operations are performed on a shoe having a certain construction, it will be understood that the same is merely illustrative of one embodiment of this invention; for this invention, as far as this method and procedure are concerned, is applicable, in many cases, to other types of shoes. It will furthermore be understood that certain features, steps and subcombinations are of utility and may be employed without reference to other features and steps; that is contemplated by and is within the scope of the appended claims. It is further obvious that various changes may be made in the details of procedure, within the scope of the appended claims, without departing from the spirit of this invention; it is, therefore, to be understood that this invention is not to be limited to the details described and/or shown.

Having thus described the invention, what is claimed is:

1. The improved process of lasting the toe portion of shoes of the McKay type which consists in placing a box toe in position on a shoe structure, lasting an upper thereover and into position on an insole, temporarily fastening the lasted members with wire, removing the wire after the box has become set, cutting away any surplus lining and box toe material, re-lasting the toe portion, holding the upper in position, placing an outsole in position and tacking through the outsole, upper and into the insole.

2. In the art of making shoes, the process comprising, wiping an upper over a last around the toe, laying the toe part of a sole on the part of the upper so lasted and temporarily tacking the sole part to the lasted part of the upper around the toe while the latter is held under tension due to the wiping.

3. In the art of making shoes, the process comprising, wiping an upper over a last around the toe, laying the toe part of a sole on the part of the upper so lasted and inserting tacks through the sole part and into the lasted part of the upper around the toe.

4. In the art of making shoes, the process comprising, wiping an upper over an insole part on a last around the toe, laying an outsole part on the part of the upper so lasted and tacking the outsole part to the lasted part of the upper around the toe while the latter is held under tension due to the wiping.

5. In the art of making shoes, the process comprising, wiping an upper over an insole part on a last around the toe, laying an outsole part on the part of the upper so lasted and inserting tacks through the sole part and into the lasted part of the upper around the toe.

6. In the art of making shoes, the process comprising, wiping an upper over a last around the toe, laying a sole part over the wipers and on the part of the upper so lasted, temporarily tacking the sole part to the lasted part of the upper while the latter is held by the wiping means and withdrawing the wiping means after such tacking.

7. In the art of making shoes, the process comprising, wiping an upper over an insole part on a last around the toe, laying an outsole part over the wipers and on the part of the upper so lasted, inserting tacks through the outsole part and into the lasted part of the upper while the latter is held by the wiping means and withdrawing the wiping means after insertion of the tacks.

8. In the art of making shoes, the process comprising, moving wipers having edge recesses over a last at the toe so as to wipe an upper thereover, laying the toe part of a sole over the wipers, inserting tacks through the sole part and wiper recesses and into the lasted upper and withdrawing the wipers after insertion of the tacks.

In testimony whereof I affix my signature this 28th day of October, 1927.

CHARLES B. SPALSBURY.